United States Patent
Yudanov (10) Patent No.: US 10,746,121 B2
(45) Date of Patent: Aug. 18, 2020

(54) METHOD FOR AVOIDING A RUNAWAY CONDITION OF AN INTERNAL COMBUSTION ENGINE

(71) Applicant: VOLVO TRUCK CORPORATION, Gothenburg (SE)

(72) Inventor: Sergi Yudanov, Västra Frölunda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 61 days.

(21) Appl. No.: 16/304,313

(22) PCT Filed: Jun. 22, 2016

(86) PCT No.: PCT/EP2016/064431
§ 371 (c)(1),
(2) Date: Nov. 26, 2018

(87) PCT Pub. No.: WO2017/220142
PCT Pub. Date: Dec. 28, 2017

(65) Prior Publication Data
US 2019/0136783 A1 May 9, 2019

(51) Int. Cl.
*F02D 41/22* (2006.01)
*F01M 13/00* (2006.01)
*F02D 41/14* (2006.01)

(52) U.S. Cl.
CPC ............ *F02D 41/22* (2013.01); *F01M 13/00* (2013.01); *F02D 41/1447* (2013.01); *F02D 41/1459* (2013.01); *F01M 2013/0038* (2013.01); *F02D 41/1446* (2013.01); *F02D 2041/227* (2013.01); *F02D 2200/101* (2013.01);

(Continued)

(58) Field of Classification Search
CPC .. F02D 41/22; F02D 41/1447; F02D 41/1459; F02D 41/1446; F02D 2041/227; F02D 2200/101; F02D 2250/08; F02D 2250/26; F01M 13/00; F01M 2013/0038; Y02T 10/40
See application file for complete search history.

(56) References Cited

U.S. PATENT DOCUMENTS

| 9,074,543 B2 | 7/2015 | Chamarthi et al. |
| 2002/0068437 A1 | 6/2002 | Weisman |
| 2009/0211545 A1 | 8/2009 | Satou |

(Continued)

FOREIGN PATENT DOCUMENTS

| JP | 200981183 A | 12/2009 |
| WO | 2015124160 A1 | 8/2015 |

OTHER PUBLICATIONS

International Search Report (Mar. 1, 2017) for corresponding International App. PCT/EP2016/064431.

*Primary Examiner* — Jacob M Amick
(74) *Attorney, Agent, or Firm* — Venable LLP; Jeffri A. Kaminski (57) ABSTRACT

In a method for avoiding a runaway condition of an internal combustion engine that includes a cylinder, an operational characteristic of the engine, presumed to be caused by an unrequested introduction of hydrocarbon into the cylinder, is detected and the engine is derated in dependence of the detection, and, while the engine is derated, a test procedure is performed to detect an unrequested introduction of hydrocarbon into the cylinder.

30 Claims, 6 Drawing Sheets

(52) U.S. Cl.
CPC ...... *F02D 2250/08* (2013.01); *F02D 2250/26* (2013.01); *Y02T 10/40* (2013.01)

(56) References Cited

U.S. PATENT DOCUMENTS

2014/0081549 A1    3/2014  Rollinger et al.
2017/0129514 A1*  5/2017  Shubs, Jr. ............... B61L 27/04

* cited by examiner

METHOD FOR AVOIDING A RUNAWAY CONDITION OF AN INTERNAL COMBUSTION ENGINE

BACKGROUND AND SUMMARY

The invention relates to a method for avoiding a runaway condition of an internal combustion engine, a computer program, a computer readable medium, a control unit, an engine system and a vehicle.

The invention can be applied in heavy-duty vehicles, such as trucks, buses and construction equipment. Although the invention will be described with respect to a heavy-duty vehicle, the invention is not restricted to this particular vehicle, but may also be used in other vehicles such as working machines and cars.

In an internal combustion engine, such as heavy duty vehicle diesel engine, there might be a risk of the engine entering a so called runaway condition, which, although rare, may seriously damage the engine. In such a condition the engine draws extra fuel from an unintended source, overspeeds, and may be destroyed by mechanical failure or seizure. The extra fuel, forming an undesired or unrequested introduction of hydrocarbon into the cylinders of the engine, may enter via the engine air intake system. The unrequested hydrocarbon may include, for example, hydrocarbon of fuel and engine oil. For example, a mixture of excess fuel and oil may be vented from the engine crankcase into the air intake via a crankcase ventilation system of the engine. The excess fuel and oil may enter the crankcase due to leakage from a fuel system (e.g. from pumps, injectors and connecting pipes), an oil leak in the seal of a turbocharger, or leakage from the cylinders into the crankcase. Further possible causes to engine runaway conditions include undesired oil or fuel leakage into the cylinders, which does not combust completely and gets re-introduced via an exhaust gas recirculation (EGR) path, and oil introduced at an air intake compressor through damaged seals in the compressor shaft.

In diesel engines using diesel oil fuel, leakage of fuel into the crankcase may be managed by a crankcase ventilation system based on the evaporation of the fuel from the warm oil in the crankcase. In a closed crankcase ventilation system so called blow-by gas from the crankcase is returned to engine air intake for combustion. However, when the fuel is volatile such as dimethyl ether (DME), a high leakage rate to the crankcase may provide correspondingly high evaporation rate, thus posing an engine runaway risk by a closed crankcase ventilation system. Providing instead an open crankcase ventilation system provides as a result ventilating the vaporized fuel to the atmosphere, which may result in a safety hazard, increases the environmental burden and may not be allowed in some jurisdictions.

U.S. Pat. No. 9,074,543 discloses, in response to a detection of a cylinder imbalance indicating oxidation of accumulated hydrocarbons, limiting the engine speed and load to reduce further hydrocarbon accumulation.

A problem with known unrequested hydrocarbon cylinder introduction detections strategies in vehicle engine systems is a lack of reliability resulting in false indications and executions of runaway risk reducing measures, such as a limp-home mode and/or blow-by gas emissions to the atmosphere, which may be un-convenient to a user of the vehicle and environmentally burdensome. The lack of reliability may be caused by highly transient operating patterns of vehicle engines. Thereby it may be impossible to accurately avoid needless triggering of runaway safety measures.

An object of the invention is to provide an internal combustion engine runaway risk detection strategy with an improved accuracy and reliability. A further object of the invention is to avoid an overreaction to an indication that an internal combustion engine is at a risk of entering a runaway condition, particularly where the engine uses a volatile fuel such as dimethyl ether (DME). Another object is to provide in a cost effective manner a balanced reaction to an indication that an internal combustion engine is at a risk of entering a runaway condition.

An aspect of the invention provides a method for avoiding a runaway condition of an internal combustion engine comprising a cylinder, comprising detecting an operational characteristic of the engine, presumed to be caused by an unrequested introduction of hydrocarbon into the cylinder, characterized by derating the engine in dependence of the detection, and performing while the engine is derated a test procedure to detect an unrequested introduction of hydrocarbon into the cylinder.

It is understood that derating the engine in dependence of the detection may involve derating the engine in response to the detection.

The derating provides a quick response to reduce a risk of the engine entering a runaway condition in case the detected operational characteristic of the engine is caused by unrequested introduction of hydrocarbon into the cylinders. However, the detected operational characteristic may have causes other than such unrequested hydrocarbon cylinder introduction. Since the cause of the detection cannot be established with a high degree of certainty, the derating is executed instead of an engine shutdown which may in itself cause a safety risk, e.g. where the vehicle is moving on a busy road. By performing the test procedure while the engine is derated, it may be established with a relatively high degree of certainty, after the detection of the operational characteristic of the engine, whether or not there is an unrequested introduction of hydrocarbon into the cylinders.

Thus, the test procedure may provide an additional, more certain level in the diagnosis of the engine system according to embodiments of the invention. This means that the detection of the operational characteristic of the engine provides a first preliminary indication that there is an unrequested introduction of hydrocarbon into the cylinder. Since this detection may have a relatively low level of certainty as to whether it is caused by such a hydrocarbon introduction, the derating provides an engine runaway risk reducing effect, while a more certain diagnosis may be provided by the test procedure. Thereby, an overreaction to the uncertain preliminary indication, e.g. by an engine shutdown, may be avoided.

The method according to embodiments of the invention may be executed with hardware provided in known modern internal combustion engine systems. Therefore the invention may provide a cost effective way of providing a balanced reaction to an indication that an internal combustion engine is at a risk of entering a runaway condition. The method may advantageously be carried out in an on-board diagnostics (OBD) system of a vehicle.

Therefore, the invention may provide a cost efficient way of improving the accuracy and reliability of a vehicle OBD and safety system, to prevent engine runaway conditions and minimise the risk of false alarms. In particular, the method according to embodiments of the invention may the used to increase the accuracy and reliability of engine runaway risk detection in cases where the risk of such a condition is increased due to the use of a volatile fuel, such as dimethyl ether (DME).

The test procedure may be initiated in dependence on said detection of the operational characteristic of the engine and/or the derating of the engine. Derating the engine may comprise reducing a maximum torque of the engine. Thereby an effective way of reducing the risk of an engine runaway condition while the test procedure is carried out is provided.

Preferably detecting an operational characteristic of the engine comprises determining during operation of the engine a first value of an engine system parameter, and comparing the first value to a first predetermined threshold value of that parameter. The engine system parameter may be a difference between the temperature of exhaust gases produced by the engine and an expected temperature of exhaust gases produced by the engine. However, in some embodiments, the engine system parameter may be the temperature of exhaust gases produced by the engine. Thereby an easy and quick way of providing the first indication of the engine runaway condition is provided.

Preferably, derating the engine in dependence of the detection comprises derating the engine in dependence of the comparison of the first engine system parameter value to the first predetermined threshold value. Preferably, derating the engine in dependence of the detection comprises derating the engine if the first engine system parameter value exceeds the first predetermined threshold value. Derating the engine may comprise reducing a maximum torque of the engine, e.g. to 85% of the maximum torque when the engine is not derated.

Preferably, where the engine is provided in a vehicle, the method comprises issuing in dependence on the detection of the operational characteristic of the engine an instruction to a driver of the vehicle to allow the engine to idle. It is understood that issuing the instruction in dependence on the detection of the operational characteristic may involve issuing the instruction in response to the detection of the operational characteristic. The method may also comprise determining in dependence on the detection of the operational characteristic of the engine whether or not the engine is idling. Thereby, it may be determined to not initiate or perform the test procedure if the engine is not idling.

Thus, it may be advantageously ensured before performing the test procedure that a condition that may be required for the procedure, i.e. engine idling, is present. Idling may in a vehicle involve an engine system operation where no gear is engaged, i.e. where the engine is uncoupled from a drivetrain and a driver engine control device, such as a gas pedal, is not manipulated, e.g. depressed, to change fuelling. The vehicle may comprise one or more sensors detecting whether or not an external engine load, other than a load provided by the drivetrain, is present, for instance sensors detecting engagement of various ancillary equipment, such as an engine fan, an air compressor, systems actuated via power take-off, etc. In some embodiments, such other loads may be detected. In case such a detection is made, it may be determined to not proceed with the test procedure until the load is removed, and/or a request may be issued to an engine operator or a vehicle driver to disengage the load, before executing the test procedure.

In some embodiments, the derating may itself alert the driver and induce him or her to allow the test procedure by idling the engine. The driver feeling a loss of power may tend to let the engine idle as an "instinctive" way of troubleshooting. Where an instruction is issued to the driver, e.g. by a message on a dashboard of the vehicle, this would likely lead to the engine being left alone to idle providing a chance to quickly exercise the test procedure.

In advantageous embodiments, where the engine comprises an inlet guide for guiding air to the cylinder, and the cylinder comprises a piston connected to a crankshaft, the engine further comprising a crankcase for housing the crankshaft, and a crankcase ventilation system which is arranged to assume an open condition in which a fluid in the crankcase is guided to the atmosphere, and a closed condition in which a fluid in the crankcase is guided to the inlet guide, the test procedure comprises determining a first value of an operating parameter while the engine is operated in a first predetermined operating condition with the crankcase ventilation system in the closed condition, determining a second value of the operating parameter while the engine is operated in the first predetermined operating condition with the crankcase ventilation system in the open condition, and determining, based at least partly on the first and second operating parameter values, whether or not there is an unrequested introduction of hydrocarbon into the cylinder.

Thus, the test procedure may involve operating the engine with the crankcase ventilation system in one of the closed and open conditions, and subsequently operating the engine in the other of the closed and open conditions. The first and second operating parameter values determined in a respective of the closed and open conditions are compared. The method may comprise determining, if the difference between the first and second operating parameter values is larger than a predetermined value difference, that there is an unrequested introduction of hydrocarbon into the cylinder. Thereby a particularly effective method of establishing whether there is an unrequested introduction of hydrocarbon into the cylinder, presumably through the crankcase ventilation system, is provided The first predetermined operating condition may be engine idling. The operating parameter may be the engine rotational speed. Thereby a relevant parameter is used which is detectable by means of available engine monitoring devices. Alternatively, the operating parameter may be some other suitable parameter, such as the exhaust temperature or the crankcase pressure.

Preferably, if the difference between the first and second operating parameter values is larger than a predetermined value difference, the crankcase ventilation system is controlled so as to assume the open condition. Thereby, the risk of an engine runaway condition due to unrequested hydrocarbon introduction into the cylinder via the crankcase ventilation system will be eliminated.

In some embodiments, if the difference between the first and second operating parameter values is larger than a predetermined value difference, the engine may be stopped. Where the engine is provided in a vehicle, stopping the engine may be done by instructing a driver of the vehicle to stop the engine. In some embodiments, if the difference between the first and second operating parameter values is larger than the predetermined value difference, it is determined whether the engine is idling and the engine is stopped if it is determined that the engine is idling. Such a stopping control may be executed by a control unit. Thereby, the risk of an engine runaway condition will be eliminated.

Preferably the method comprises determining while the engine is derated a second value of the engine system parameter, and comparing the second value to a second predetermined threshold value. Thereby, the initiation of the test procedure may be dependent on the comparison of the second engine system parameter value to the second predetermined threshold value. The method may comprise determining to initiate the test procedure if the second engine system parameter value is lower than the second predetermined threshold value. On the other hand, if the second engine system parameter value exceeds the second predetermined threshold value, the engine may be derated further. Derating the engine further may comprise operating the engine in a limp-home mode. Derating the engine further in this manner provides a quick response to reduce a risk of the engine entering a runaway condition. The second engine system parameter value being determined while the engine is derated provides an additional basis for determining an appropriate action in view of a potential engine runaway risk.

Where the engine comprises an inlet guide for guiding air to the cylinder, and the cylinder comprises a piston connected to a crankshaft, the engine further comprising a crankcase for housing the crankshaft and a crankcase ventilation system which is arranged to assume an open condition in which a fluid in the crankcase is guided to the atmosphere, and a closed condition in which a fluid in the crankcase is guided to the inlet guide, the method may comprise, if the second engine system parameter value exceeds the second predetermined threshold value, controlling the crankcase ventilation system so as to assume the open condition. This will reduce the risk of any further unrequested hydrocarbon entering the cylinders via the inlet guide.

It should be noted that where the engine is provided in a vehicle, the crankcase ventilation system may be controlled by a control unit. However, alternatively or in addition the vehicle may comprise manually controllable means for switching the crankcase ventilation system from the closed condition to the open condition. Such means may be provided in the form of a control device, such as a switch, arranged to be manipulated by a driver of the vehicle. In some embodiments, the crankcase ventilation system may be arranged so that a control action via such manually controllable means will have priority over a request from a control unit arranged to control the crankcase ventilation system. In such a system, a control action using the manually controllable means may override a command from the control unit, and enforce a shift to the open condition irrespective, of the command from the control unit.

Preferably, if the second engine system parameter value exceeds the second predetermined threshold value, the engine is stopped. Where the engine is provided in a vehicle, stopping the engine may be done by instructing a driver of the vehicle to stop the engine, or by determining whether the engine is idling and stopping the engine if it is determined that the engine is idling. Where the engine comprises an inlet guide for guiding air to the cylinder, stopping the engine may comprise controlling a throttle valve so as to block the inlet guide. Thereby, the risk of an engine runaway condition may be reduced, e.g. if a catastrophic crankcase fuel leakage has occurred and derating the engine will not prevent the runaway condition. However, if the second engine system parameter value does not exceed the second predetermined threshold value, this may provide an indication that the engine is safe to run, and instead of stopping it the test procedure described above may be executed.

The second predetermined threshold value may be the same as the first predetermined threshold value, or it may be different therefrom.

In advantageous embodiments, where the engine comprises a fuel system for injecting fuel into the cylinder, the method comprises determining while the engine is operated in a second predetermined operating condition a value of an engine operation parameter, comparing the determined engine operation parameter value to a stored value of the engine operation parameter associated with the predetermined engine condition, and determining based at least partly on the comparison whether or not there is an indication of an unrequested introduction of hydrocarbon into the cylinder. The stored engine operation parameter value may be stored in a storage accessible to an engine system control unit. The engine operation parameter value may be a demanded fuel amount to be injected, or a rotational speed of the engine. In some embodiments, the demanded fuel amount and the rotational speed may both form the engine operation parameter, and determined values of the demanded fuel amount and the rotational speed may be compared to respective stored values of the demanded fuel amount and the rotational speed. The second predetermined operating condition may be engine idling. By such embodiments, a determination may be made that there is an indication of an unrequested introduction of hydrocarbon into the cylinder if the difference between the determined engine operation parameter value and the stored engine operation parameter value is larger than a predetermined threshold value.

Thereby, an additional process is provided for determining whether or not there is an unrequested introduction of hydrocarbon into the cylinder. This provides means, in addition to the detection of the operational characteristic of the engine and the test procedure, to obtain an indication of an unrequested introduction of hydrocarbon into the cylinder. In some embodiments, the test procedure may be performed in dependence on the comparison of the determined engine operation parameter value to the stored value of the engine operation parameter. Thereby, performing the test procedure may be avoided if said comparison suggests or indicates that there is no unrequested introduction of hydrocarbon into the cylinder. Where the comparison of the determined engine operation parameter value to the stored value of the engine operation parameter indicates or suggests that there is an unrequested introduction of hydrocarbon into the cylinder, the test procedure follows to provide a more certain determination of whether or not there is such an introduction. Thereby, additional certainty may be provided to the unrequested hydrocarbon cylinder introduction detection, whilst avoiding unnecessary messages or false fault alerts to an operator of the engine or a driver of a vehicle in which the engine is provided, such as a request to allow the engine to idle. Also, unnecessary switching of a crankcase ventilation system to an open condition may be avoided. Such means to detect an indication of an unrequested hydrocarbon cylinder introduction may advantageously be performed without adding any dedicated sensors to the engine system. As an example, in electronically controlled engines there may be a control feature in the form of an idle governor that adjusts the fuelling demand to the injectors in real time in order to keep the idle engine rotational speed at a certain level. If there is an unrequested hydrocarbon cylinder introduction the idle governor may potentially reduce fuelling demand to zero while trying to keep the engine speed at the required level, and such a fuelling demand may advantageously serve as an indication of the unrequested hydrocarbon cylinder introduction.

The method may further comprise, if it is determined that there is not an unrequested introduction of hydrocarbon into the cylinder, adjusting the stored engine operation parameter value. E.g. where the above described determination, based at least partly on the comparison of the engine operation parameter value to the stored engine operation parameter value, whether or not there is an indication of an unrequested introduction of hydrocarbon into the cylinder, is followed by the above described test procedure, the method may further comprise, if it is determined by the test procedure that there is not an unrequested introduction of hydrocarbon into the cylinder, adjusting the stored engine operation parameter value.

For example, if the test procedure indicates, in contradiction to the determination based at least partly on the comparison of the engine operation parameter value to the stored engine operation parameter value, that there is no unrequested introduction of hydrocarbon into the cylinder, it may be assumed that the stored engine operation parameter value is incorrect, and therefore it is advantageously adjusted. The adjustment may involve replacing in a storage accessible to an engine system control unit the stored engine operation parameter value with the determined engine operation parameter value. The discrepancy between the determined engine operation parameter value and the stored engine operation parameter may be caused e.g. by a "drift" in the parameter values due to the operation history of the engine. The adjustment of the stored engine operation parameter value will further reduce the risk of the overreactions due to false indications of engine runaway conditions. Thereby, a learning algorithm with a parameter drift compensating feature is provided.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
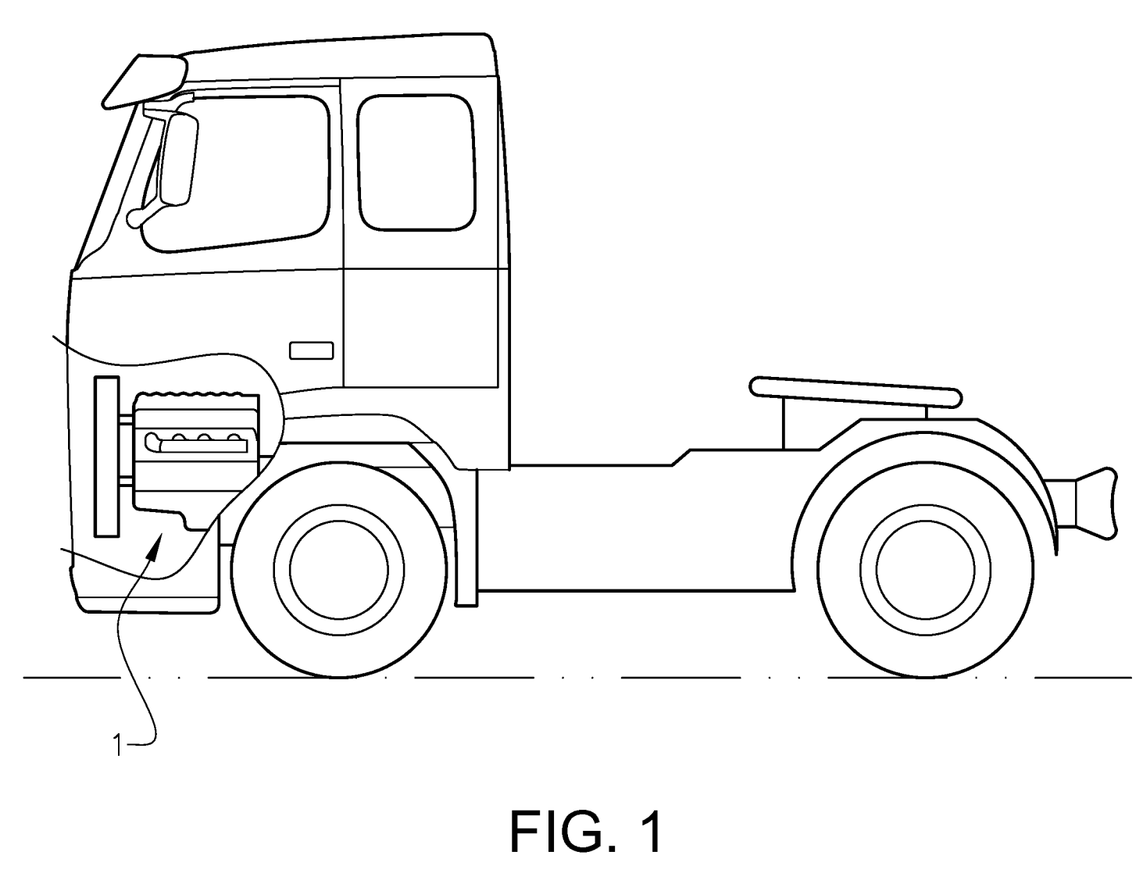
FIG. 1 is a side view of a vehicle in the form of a truck.

FIG. 1 shows a vehicle in the form of a truck, or a tractor for a semitrailer. It should be noted that the vehicle can be of a variety of alternative types, e.g. it may be a car, a bus, or a working machine such as a wheel loader. The vehicle comprises an internal combustion engine system with an internal combustion engine 1 with a plurality of cylinders. It should be noted that the invention is applicable to engines with any number of cylinders, even with a single cylinder. Also, the invention is applicable to engines with any cylinder configuration, e.g. an in-line configuration or a V-configuration.

Figure 2:
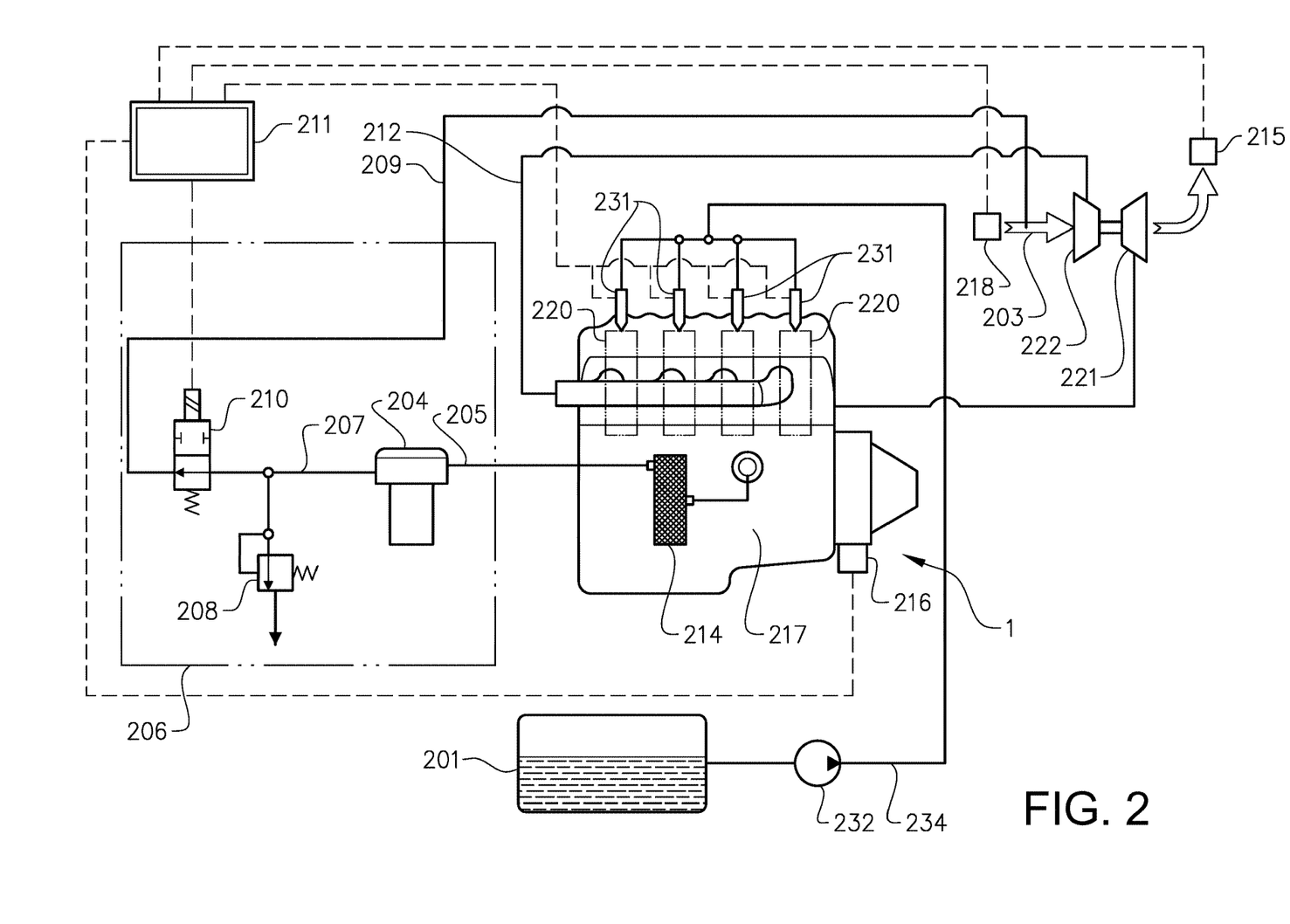
FIG. 2 is a schematic view of an engine system in the vehicle in FIG. 1.

Reference is made to FIG. 2, which illustrates an engine system according to an example embodiment of the present invention. The engine system comprises the internal combustion engine 1 which has a plurality of cylinders, in this example four cylinders 220 indicated with broken lines in FIG. 2, and a crankcase 217 housing a crankshaft (not shown) connected to pistons (not shown) in the cylinders 220 via respective connecting rods. The crankcase 217 is arranged to hold a hydrocarbon lubricant of a lubrication system of the engine 1 as is known per se. In this embodiment, the engine is a diesel engine, i.e. an engine adapted for a diesel cycle.

The engine system comprises a fuel container 201 for hydrocarbon fuel. In this embodiment the fuel container 201 is arranged to hold dimethyl ether (DME). However, in alternative embodiments the fuel container 201 may be arranged to contain any fuel that is suitable for the specific engine type. Hence, the fuel container 201 may be arranged to hold diesel fuel, liquefied natural gas (LNG), etc. It should be noted that the invention is equally applicable to engines adapted for an Otto cycle. Thereby, the fuel container may be arranged to hold fuel suitable for Otto engines, such as petrol or again LNG. The engine system further comprises an injector 231 at each cylinder. The engine system further comprises, between the fuel container 201 and the injectors 231, a pump 232. The pump 232 is arranged to deliver fuel from the fuel container 201 to injectors 231, via a fuel conduit 234. The injectors 231 are arranged to be controlled by a control unit 211.

The engine system comprises a crankcase ventilation system 206, which will be described in detail below, and a turbo unit comprising a turbine 221 and a compressor 222. More specifically, a conduit 209 connects the crankcase ventilation system 206 to an air intake 203 of the engine 1, upstream of the compressor 222. An intake manifold 212 is arranged to guide charge air from the compressor 222 to the cylinders of the engine 1. The air intake 203 and the intake manifold 212 are herein collectively referred to as an inlet guide.

The control unit 211 is arranged to control the engine 1 so as to operate with a normal rating, in which the engine may produce a first maximum torque. As described below, the control unit 211 is also arranged to derate the engine 1 under certain conditions, whereby the engine may produce a second maximum torque which is lower than the first maximum torque. The control unit 211 is also arranged to derate the engine further under further conditions described below, whereby the engine may produce a third maximum torque which is lower than the second maximum torque. The normal rating and the derated modes are obtained by suitable control of the injectors 231.

The crankcase ventilation system 206 in the non-limiting example depicted in FIG. 2 is similar to a system described in WO2015124160A1, incorporated herein by reference. The crankcase ventilation system 206 comprises an oil mist separator 204, a relief valve 208, and a control valve 210 electrically connected to the control unit 211. The oil mist separator 204 is connected to an oil trap 214 via a blow-by path 205. The oil trap 214 is connected to the crankcase 217. Thus, the oil mist separator 204 is arranged downstream of the crankcase 217 and is arranged to receive a fluid from the crankcase. The oil mist separator 210 is adapted to separate oil from the fluid received from the crankcase 217, and provides a return path (not shown) to the crankcase 217 for the separated oil.

The relief valve 208 is arranged downstream the oil mist separator 204 and is arranged to be in fluid communication with the oil mist separator 204. The relief valve 208 is arranged to enter into a state in which a communication is provided between the oil mist separator 204 and an ambient environment of the engine 1, i.e. the atmosphere, when relief valve 208 is exposed to a pressure exceeding a predefined pressure limit.

The control valve 210 is arranged downstream the oil mist separator 204 and the relief valve 208. The control valve 210 is arranged to selectively, by control of the control unit 211, provide a fluid communication between the oil mist separator 204 and the intake 203 of the engine 1. The control valve 210 may, for example, be a two-way valve.

When there is fluid leakage formed in the crankcase 217 from e.g. the combustion process of the internal combustion engine, this crankcase fluid leakage is directed out from the crankcase through the blow-by path 205 and directed into the oil mist separator 204. In the oil mist separator 204 the leaked crankcase fluid is subjected to a separation process such that the fluid leaving the oil mist separator 204 is free, or relatively free, from particles that may negatively affect the environment.

When the control valve 210 is open, the fluid may be transported from the crankcase 217 via the oil mist separator 204 to the air intake 203. Thereby the crankcase ventilation system 206 is in what is herein referred to as a closed condition. By closing the control valve 210, such a transportation is prevented. Thereby the crankcase ventilation system 206 is in what is herein referred to as an open condition. In the open condition, a pressure might build up upstream of the relief valve 208. When such a pressure builds up and exceeds the predefined pressure limit, the relief valve 208 opens so as to allow the fluid from the oil mist separator 204 to be released to the atmosphere.

Other valve arrangements are possible for the crankcase ventilation system 206. For example, the relief valve 208 and the control valve 210 may be replaced by a single valve controllable by the control unit 211 so as to selectively provide a communication between the oil mist separator 204 and the air intake 203 and a communication between the oil mist separator 204 and the atmosphere.

The control unit 211 is also arranged to receive signals from a temperature sensor 215 arranged to detect the temperature of exhaust gases produced by the engine. The temperature sensor is located in an exhaust guide downstream of the turbine 221. The control unit 211 is also arranged to receive signals from a rotational speed sensor 216 arranged to detect the rotational speed of the engine 1. The control unit 211 is further arranged to receive signals from an air flow sensor 218 arranged to detect the air flow in the air intake 203 as is known per se.

Figure 3:
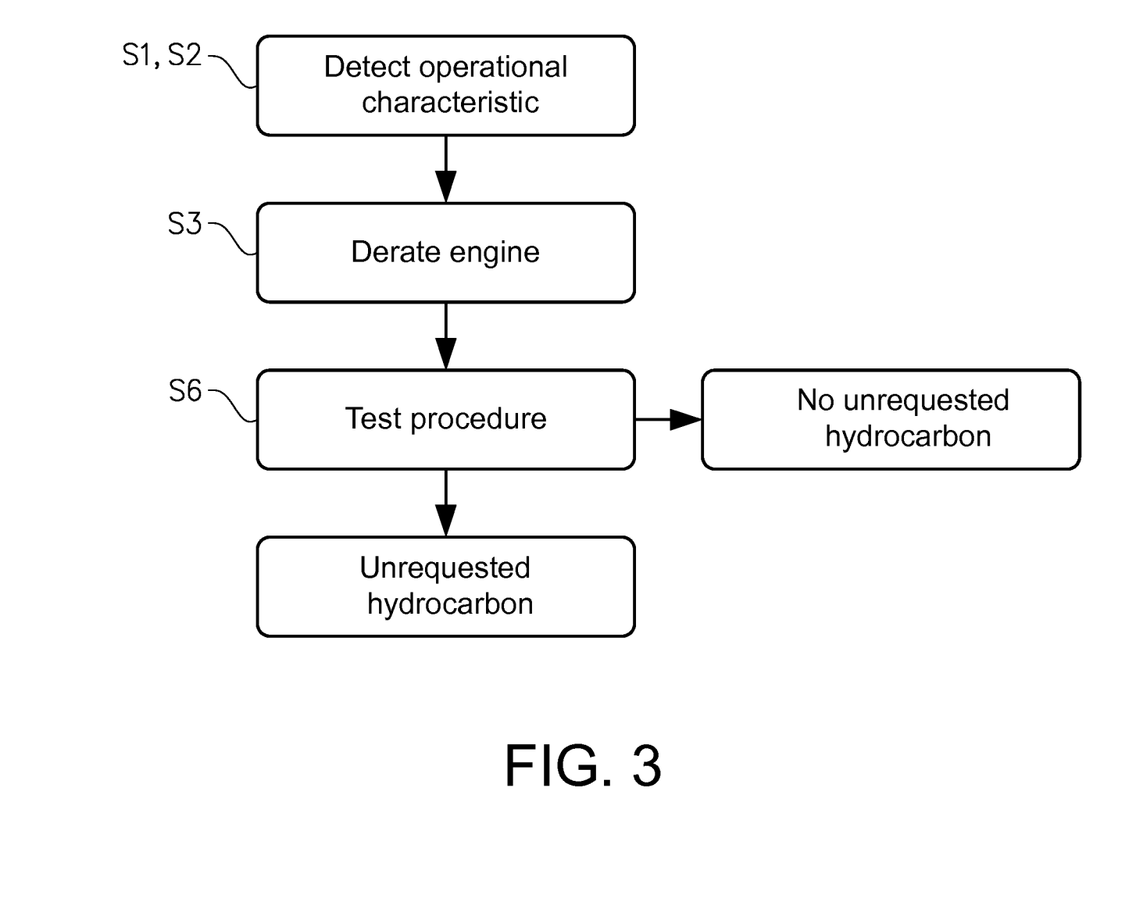
FIG. 3 is a block diagram depicting steps in a method according to an embodiment of the invention.

FIG. 3 is a block diagram depicting steps in a method for avoiding a runaway condition of the engine 1 according to an embodiment of the invention. The method comprises detecting S1, S2 an operational characteristic of the engine 1, presumed to be caused by an unrequested introduction of hydrocarbon into the cylinders 220. An unrequested introduction of hydrocarbon into the cylinders may have any of a number of causes, e.g. a mixture of excess fuel and oil may be vented from the crankcase 217 into the air intake 203 via the crankcase ventilation system 206. The excess fuel may enter the crankcase 217 e.g. due to leakage from the fuel conduit 234, or from the cylinders 220.

The method further comprises derating S3 the engine 1 in dependence of the detection. The derating provides a quick response to reduce a risk of the engine entering a runaway condition or suffering damage due to overload etc. in case the detected operational characteristic of the engine is caused by unrequested introduction of hydrocarbon into the cylinders 220. However, the detected operational characteristic may have causes other than such unrequested hydrocarbon cylinder introduction. Since the cause of the detection cannot be established with a high degree of certainty, the derating is executed instead of an engine shutdown which may in itself cause a safety risk, e.g. where the vehicle is moving on a busy road.

The method also comprises performing while the engine is derated a test procedure S6 to detect an unrequested introduction of hydrocarbon into the cylinders 4. By such a test procedure, it may be established with a relatively high degree of certainty, after the detection of the operational characteristic of the engine, whether or not there is an unrequested introduction of hydrocarbon into the cylinders 220.

Figure 4:
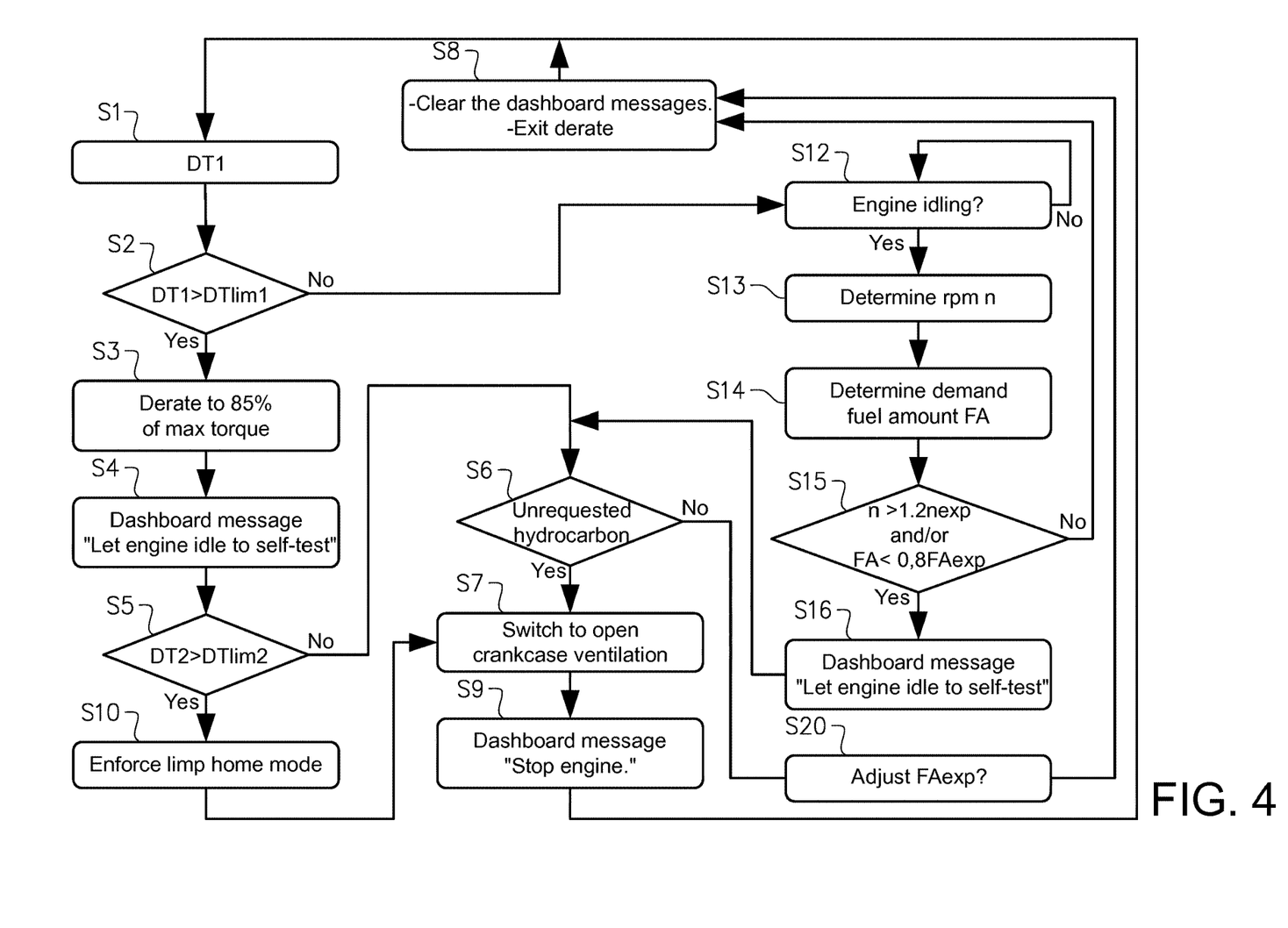
FIG. 4 is a block diagram depicting steps in a method according to a further embodiment of the invention.

FIG. 4 is a block diagram depicting steps in a method for avoiding a runaway condition of the engine 1 according to a further embodiment of the invention. The method comprises detecting S1, S2 an operational characteristic of the engine 1, presumed to be caused by an unrequested introduction of hydrocarbon into the cylinder. The detection comprises determining S1 during operation of the engine 1 a first value DT1 of an engine system parameter, and comparing S2 the first value to a first predetermined threshold value DTlim1. This detection is done under normal operation of the engine system, with the crankcase ventilation system 206 in the closed condition.

Figure 5:
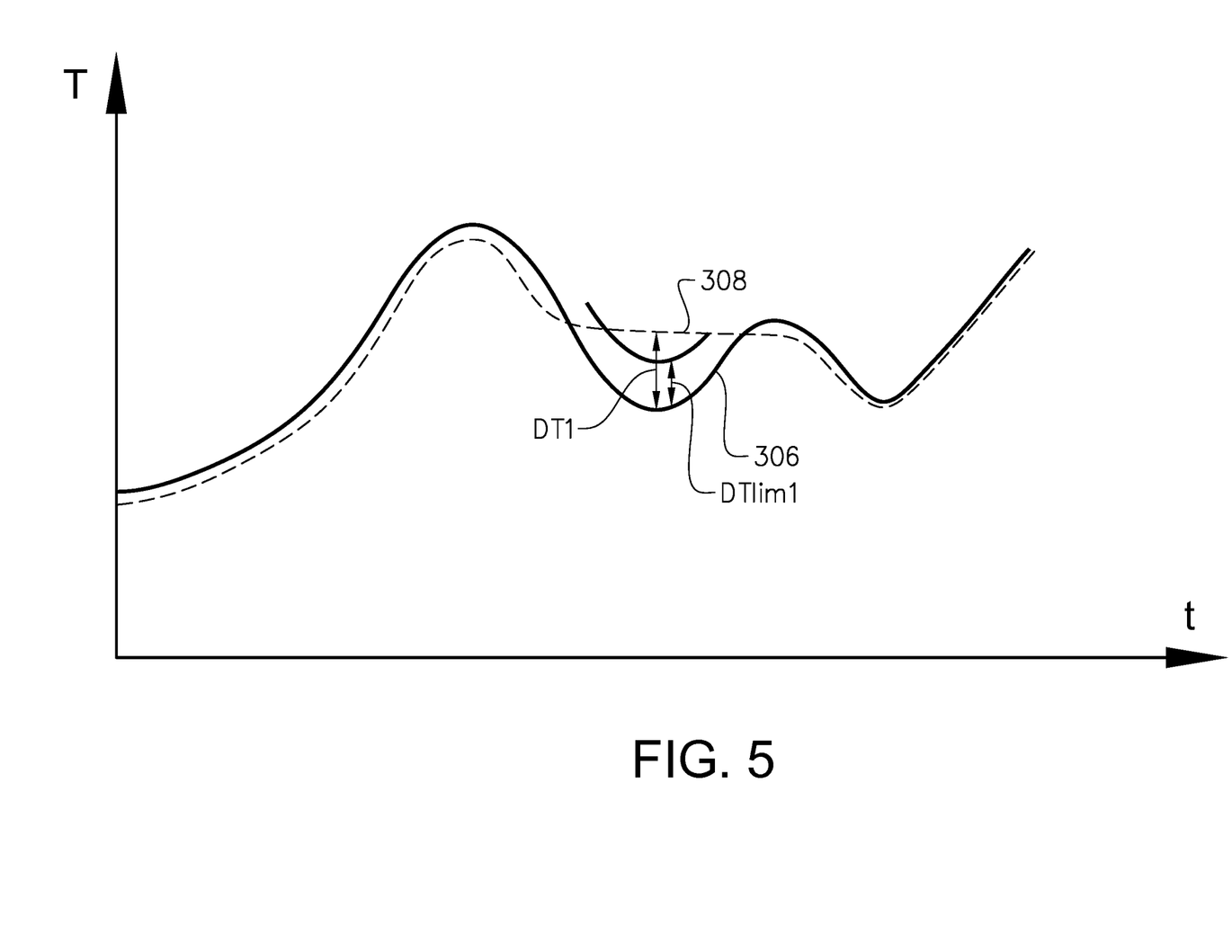
FIG. 5 is a diagram illustrating a step in the method depicted in FIG. 4.

An example of the detection S1, S2 of the operational characteristic of the engine 1 is illustrated in FIG. 5 showing a graph of the exhaust temperature T as a function of time t. It should be noted that the depicted graph in FIG. 5 showing the exhaust temperature variation over time when the vehicle is running only serves as an example.

The control unit 211 determines repetitively at a series of points in time the expected exhaust temperature, preferably the expected maximum temperature. A series of expected exhaust temperatures is illustrated in FIG. 5 with the line 306. More specifically the control unit 211 has access to a model which calculates the expected exhaust temperature based on current values of operational parameters including the amount of fuel injected by the injectors 231, the rotational speed of the engine 1 as obtained from the rotational speed sensor 216, and the air flow as detected by the air flow sensor 218. As the operational conditions change, the expected exhaust temperature changes as can be seen by the line 306.

The dotted line 308 in FIG. 5 illustrates a series of exhaust temperatures as determined by means of the temperature sensor 215. Repetitively the difference between the respective exhaust temperature 308 as determined by means of the temperature sensor 215 and the expected temperature 306 is determined, this difference forming in this example the first value DT1 of the engine system parameter. In the example in FIG. 5, after following the expected exhaust temperature, the exhaust temperatures 308 as determined by means of the temperature sensor 215 become larger than the corresponding expected temperature. The first predetermined threshold value DTlim1 is in this example formed by a maximum allowable difference between on one hand the respective exhaust temperature 308 as determined by means of the temperature sensor 215 and on the other hand the temperature 306 expected, as mentioned above, at the operational conditions in which the exhaust temperature 308 is determined.

Reference is made again to FIG. 4. If the first value DT1 of the engine system parameter exceeds the first predetermined threshold value DTlim1, the engine is derated S3 and thereby limited to producing the second maximum torque which as mentioned is lower than the first maximum torque providing a limitation during normal operation. The second maximum torque may be e.g. 85% of the first maximum torque.

In addition, if the first value DT1 of the engine system parameter exceeds the first predetermined threshold value DTlim1, an instruction is issued S4 to a driver of the vehicle to allow the engine to idle. This instruction may be provided by visual means, e.g. by a message on a dashboard of the vehicle, and/or by audible means.

In this embodiment, the method comprises determining by means of the temperature sensor 215, while the engine is derated, a second value of the engine system parameter, and comparing S5 the second value DT2 to a second predetermined threshold value DTlim2. Similarly to the first value DT1 of the engine system parameter, the second value DT2 is formed by the difference between the exhaust temperature as determined by means of the temperature sensor 215 and the expected temperature 306.

If the second engine system parameter value DT2 exceeds S5 the second predetermined threshold value DTlim2, the engine is derated further S10, and thereby limited to producing the third maximum torque which as mentioned is lower than the second maximum torque. Such a further derating of the engine may comprise operating the engine in a limp-home mode, which may involve limitations on one or more additional engine and/or vehicle control parameters. If the second engine system parameter value DT2 exceeds S5 the second predetermined threshold value DTlim2 while the engine is derated, the further derating provides a quick response to reduce a risk of the engine entering a runaway condition and/or suffering serious damage.

Further, if the second engine system parameter value DT2 exceeds S5 the second predetermined threshold value DTlim2, the control valve 210 is controlled S7 so as for the crankcase ventilation system 206 to assume the open condition. This will reduce the risk of any further unrequested hydrocarbon entering the cylinders 220 via the air intake 203. In addition, the method may comprise instructing S9 the driver of the vehicle to stop the engine if the second engine system parameter value DT2 exceeds S5 the second predetermined threshold value DTlim2.

In this embodiment, if on the other hand the second engine system parameter value DT is lower S5 than the second predetermined threshold value DTlim, it is determined to initiate a test procedure S6 while the engine is derated. By such a test procedure, it may be established with a relatively high degree of certainty, after the detection of the operational characteristic of the engine, whether or not there is an unrequested introduction of hydrocarbon into the cylinders 220 that originates from the crankcase.

Figure 6:
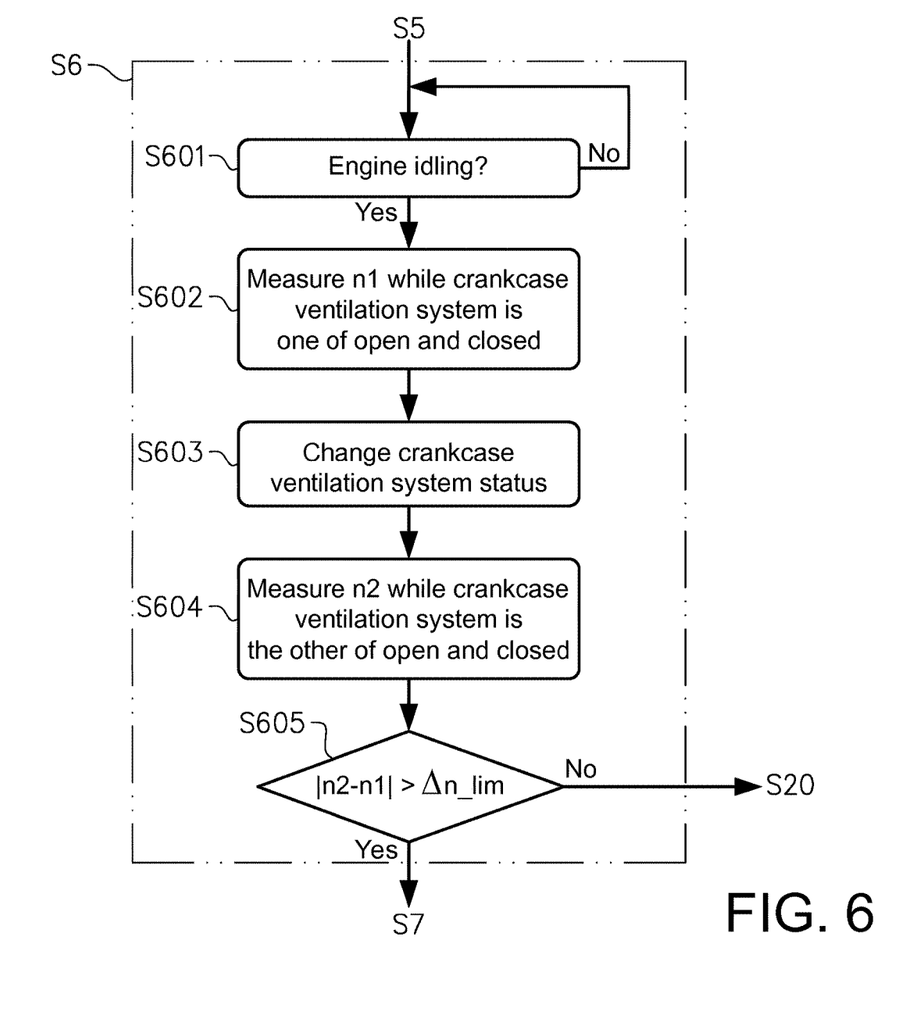
FIG. 6 is a block diagram depicting further steps in the method depicted in FIG. 4.

Reference is made to FIG. 6. The test procedure comprises, following said instruction S4 to the driver, determining S601 whether the engine is operated in a first predetermined operating condition, in this example whether the engine is idling. If it is determined that the engine is idling, a first value n1 of an operating parameter in the form of the engine rotational speed is determined S602 by means of the rotational speed sensor 216. The rotational speed determination S602 is performed with the crankcase ventilation system 206 in the closed condition, i.e. with the control valve 210 (FIG. 2) in the open state allowing a communication between the oil mist separator 204 and the air intake 203.

Subsequently, the status of the crankcase ventilation system 206 is changed S603 to the open condition, i.e. with the control valve 210 (FIG. 2) in the closed state allowing a communication between the oil mist separator 204 and the atmosphere via the relief valve 208. With the crankcase ventilation system 206 in the open condition a second value n2 of the engine rotational speed is determined S604 while the engine is idling.

Subsequently it is determined S605, based on the first and second operating engine rotational speed values n1, n2, whether or not there is an unrequested introduction of hydrocarbon into the cylinders 220. If the difference between the first and second engine rotational speed values n1, n2 is larger than a predetermined value difference, it is determined that there is an unrequested introduction of hydrocarbon into the cylinders 220, and the control valve 210 is controlled S7 so as for the crankcase ventilation system 206 to assume the open condition, (FIG. 4). This will reduce the risk of any further unrequested hydrocarbon entering the cylinders 220 via the air intake 203.

As can be seen in FIG. 4, the method may comprise instructing S9 the driver of the vehicle to stop the engine if the test procedure S6 indicates that there is an unrequested introduction of hydrocarbon into the cylinders 220.

If on the other hand the test procedure S6 indicates that there is no unrequested introduction of hydrocarbon into the cylinders 220, i.e. if the difference between the first and second engine rotational speed values n1, n2 is smaller than the predetermined value difference (FIG. 5), a stored fuel amount value FAexp will be adjusted S20 as explained further below. In addition, the idling instruction dashboard message will be removed S8 and the engine will be controlled so as to exit S8 the derated condition.

As can be seen in FIG. 4, if the first value DT1 of the engine system parameter does not exceed S2 the first predetermined threshold value DTlim1 it is determined S12 whether or not the engine is idling. If it is found that the engine is not idling, the determination whether or not the engine is idling is simply repeated, preferably after the lapse of a predetermined time interval. If it is determined that the engine is idling, an additional process S13-S15, described below, to establish whether there is an indication of an unrequested introduction of hydrocarbon into the cylinders 220, is executed. Thus, this process is carried out repeatedly during normal engine operation whenever a chance of it is given, i.e. whenever the engine is found to be idling. Once it has been determined S12 that the engine is idling, an engine operation parameter in the form of the engine rotational speed n is determined S13 by means of the rotational speed sensor 216. Further, the control unit 211 determines S14 a further engine operation parameter in the form of a demanded fuel amount FA to be injected by the injectors 231.

Subsequently, the demanded fuel amount FA is compared S15 to a stored fuel amount value FAexp associated with a particular engine idling condition. Based on this comparison it is determined S15 whether or not there is an unrequested introduction of hydrocarbon into the cylinders 220. If the difference between the determined demanded fuel amount FA and the stored fuel amount value FAexp is larger than a predetermined threshold value, in this example 20% of the stored fuel amount value FAexp, it is determined that there is an unrequested introduction of hydrocarbon into the cylinders 220. More specifically, if the determined demanded fuel amount FA is smaller than 80% of the stored fuel amount value FAexp, it is determined that there is an unrequested introduction of hydrocarbon into the cylinders 220. Thereupon, similarly to step S4 described above, an instruction is issued S16 to a driver of the vehicle to allow the engine to idle, and the test procedure S6 described above is executed.

The method also comprises comparing S15 the determined engine rotational speed n to a stored engine rotational speed value nexp associated with the engine idling condition. Based on this comparison it is determined S15 whether or not there is an unrequested introduction of hydrocarbon into the cylinders 220. If the difference between the determined engine rotational speed n and the stored engine rotational speed value nexp is larger than a predetermined threshold value, in this example 20% of the stored engine rotational speed value nexp, it is determined that there is an unrequested introduction of hydrocarbon into the cylinders 220. More specifically, if the determined engine rotational speed n is larger than 120% of the stored engine rotational speed value nexp, it is determined that there is an unrequested introduction of hydrocarbon into the cylinders 220. Again, thereupon the engine is derated S16 so as to allow a maximum torque of 80% of its normal maximum torque, and the test procedure S6 described above is executed.

If the test procedure S6 indicates in contradiction to the indication provided by the determination in step S15 that there is no unrequested introduction of hydrocarbon into the cylinders 220, it is assumed that the stored fuel amount value FAexp, used in the determination in step S15, is incorrect, and this value if therefore adjusted S20.

If on the other hand the determined demanded fuel amount FA is larger than 80% of the stored fuel amount value FAexp, and the determined engine rotational speed n is smaller than 120% of the stored engine rotational speed value nexp, it is determined that there is no unrequested introduction of hydrocarbon into the cylinders 220. Thereby, the idling instruction dashboard message will be removed S8 and the engine will be controlled so as to exit S8 the derated condition.

It is to be understood that the present invention is not limited to the embodiments described above and illustrated in the drawings; rather, the skilled person will recognize that many changes and modifications may be made within the scope of the appended claims.

The invention claimed is:

1. A method for avoiding a runaway condition of an internal combustion engine comprising a cylinder, comprising
detecting an operational characteristic of the engine, presumed to be caused by an unrequested introduction of hydrocarbon into the cylinder,
derating the engine in dependence of the detection,
performing while the engine is derated a test procedure to detect an unrequested introduction of hydrocarbon into the cylinder,
the engine comprising an inlet guide for guiding air to the cylinder, and the cylinder comprising a piston connected to a crankshaft, the engine further comprising a crankcase for housing the crankshaft, wherein the engine comprises a crankcase ventilation system which is arranged to assume an open condition in which a fluid in the crankcase is guided to the atmosphere, and a closed condition in which a fluid in the crankcase is guided to the inlet guide,
determining a first value of an operating parameter while the engine is operated in a first predetermined operating condition with the crankcase ventilation system in the closed condition,
determining a second value (n2) of the operating parameter while the engine is operated in the first predetermined operating condition with the crankcase ventilation system in the open condition, and
determining, based at least partly on the first and second operating parameter values, whether or not there is an unrequested introduction of hydrocarbon into the cylinder.

2. A method according to claim 1, wherein the test procedure is initiated in dependence on the detection and/or the derating.

3. A method according to claim 1, wherein derating the engine comprises reducing a maximum torque of the engine.

4. A method according to claim 1, wherein detecting an operational characteristic of the engine comprises determining during operation of the engine a first value of an engine system parameter, and comparing the first value to a first predetermined threshold value.

5. A method according to claim 4, wherein the engine system parameter is a difference between the temperature of exhaust gases produced by the engine and an expected temperature of exhaust gases produced by the engine.

6. A method according to claim 4, wherein derating the engine in dependence of the detection comprises derating the engine in dependence of the comparison of the first engine system parameter value to the first predetermined threshold value.

7. A method according to claim 4, wherein derating the engine in dependence of the detection comprises derating the engine if the first engine system parameter value exceeds the first predetermined threshold value.

8. A method according to claim 1, where the engine is provided in a vehicle, comprising issuing in dependence on the detection of the operational characteristic of the engine an instruction to a driver of the vehicle to allow the engine to idle.

9. A method according to claim 1, comprising determining, if the difference between the first and second operating parameter values is larger than a predetermined value difference, that there is an unrequested introduction of hydrocarbon into the cylinder.

10. A method according to claim 1, wherein the first predetermined operating condition is engine idling.

11. A method according to claim 1, wherein the operating parameter is the engine rotational speed.

12. A method according to claim 1, comprising, if the difference between the first and second operating parameter values is larger than a predetermined value difference, controlling the crankcase ventilation system so as to assume the open condition.

13. A method according to claim 1, comprising, if the difference between the first and second operating parameter values is larger than a predetermined value difference, stopping the engine.

14. A method according to claim 4, comprising determining while the engine is derated a second value of the engine system parameter, and comparing the second value to a second predetermined threshold value.

15. A method according to claim 14, wherein the initiation of the test procedure is dependent on the comparison of the second engine system parameter value to the second predetermined threshold value.

16. A method according to claim 14, comprising determining to initiate the test procedure if the second engine system parameter value is lower than the second predetermined threshold value.

17. A method according to claim 14, comprising, if the second engine system parameter value exceeds the second predetermined threshold value, derating the engine further.

18. A method according to claim 17, wherein derating the engine further comprises operating the engine in a limp-home mode.

19. A method for avoiding a runaway condition of an internal combustion engine comprising a cylinder, where the engine comprises an inlet guide for guiding air to the cylinder, and the cylinder comprises a piston connected to a crankshaft, the engine further comprising a crankcase for housing the crankshaft and a crankcase ventilation system which is arranged to assume an open condition in which a fluid in the crankcase is guided to the atmosphere, and a closed condition in which a fluid in the crankcase is guided to the inlet guide, the method comprising
- detecting an operational characteristic of the engine, presumed to be caused by an unrequested introduction of hydrocarbon into the cylinder, wherein detecting an operational characteristic of the engine comprises determining during operation of the engine a first value of an engine system parameter, and comparing the first value to a first predetermined threshold value,
- derating the engine in dependence of the detection,
- performing while the engine is derated a test procedure to detect an unrequested introduction of hydrocarbon into the cylinder,
- determining while the engine is derated a second value of the engine system parameter,
- comparing the second value to a second predetermined threshold value, and,
- upon detecting that the second engine system parameter value exceeds the second predetermined threshold value, controlling the crankcase ventilation system so as to assume the open condition.

20. A method according to claim 14, comprising, if the second engine system parameter value exceeds the second predetermined threshold value, stopping the engine.

21. A method for avoiding a runaway condition of an internal combustion engine comprising a cylinder, comprising
- detecting an operational characteristic of the engine, presumed to be caused by an unrequested introduction of hydrocarbon into the cylinder,
- derating the engine in dependence of the detection, and
- performing while the engine is derated a test procedure to detect an unrequested introduction of hydrocarbon into the cylinder,
- wherein the engine comprises a fuel system for injecting fuel into the cylinder,
- determining a value of an engine operation parameter, and
- comparing the determined engine operation parameter value to a stored value of the engine operation parameter,
- wherein the determination of the engine operation parameter value is done while the engine is operated in a predetermined operating condition, and the stored value of the engine operation parameter is associated with the predetermined engine condition,
- determining based at least partly on the comparison whether or not there is an indication of an unrequested introduction of hydrocarbon into the cylinder.

22. A method according to claim 21, wherein the engine operation parameter value is a demanded fuel amount to be injected.

23. A method according to claim 21, wherein the engine operation parameter value is a rotational speed of the engine.

24. A method according to claim 21, wherein the predetermined operating condition is engine idling.

25. A method according to claim 21, wherein a determination is made that there is an indication of an unrequested introduction of hydrocarbon into the cylinder if the difference between the determined engine operation parameter value and the stored engine operation parameter value is larger than a predetermined threshold value.

26. A computer comprising a computer program for performing the steps of claim 1 when the program is run on the computer.

27. A non-transitory computer readable medium carrying a computer program for performing the steps of claim 1 when the program product is run on a computer.

28. A control unit configured to perform the steps of the method according to claim 1.

29. An engine system comprising a control unit according to claim 28.

30. A vehicle comprising an engine system according to claim 29.

* * * * *